J. L. & G. Babson.
Pendulum Scales.
N°. 82,477. Patented Sep. 29, 1868.
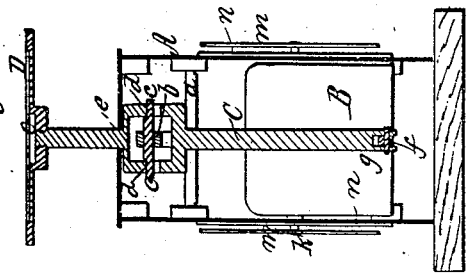
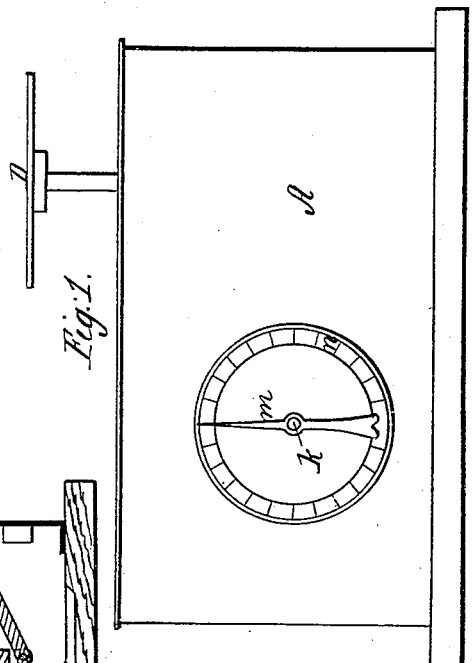
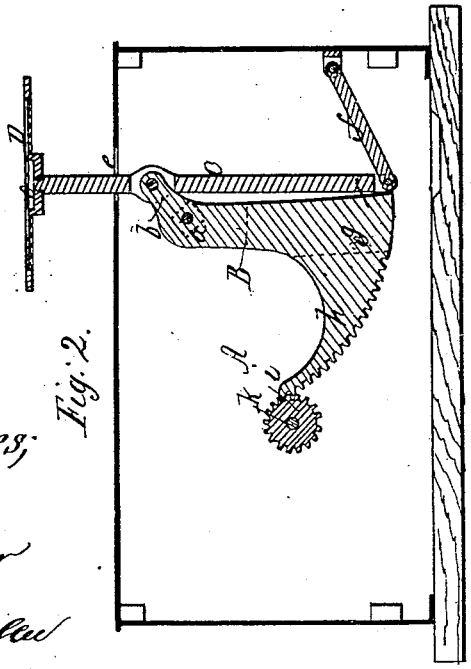
Witnesses:
S. N. Piper
Lauritz Melan
Inventor,
J. L. & G. Babson.
by their attorney,
R. H. Eddy

UNITED STATES PATENT OFFICE.

GEORGE BABSON AND JOHN L. BABSON, OF ROCKPORT, MASSACHUSETTS.

IMPROVEMENT IN WEIGHING APPARATUS.

Specification forming part of Letters Patent No. 82,477, dated September 29, 1868; antedated September 17, 1868.

*To all whom it may concern:*

Be it known that we, GEORGE BABSON and JOHN L. BABSON, of Rockport, in the county of Essex and State of Massachusetts, have invented a new and useful Apparatus for Weighing Bodies or Articles of various kinds; and we do hereby declare the same to be fully described in the following specification and represented in the accompanying drawings, of which—

Figure 1 denotes a side elevation, and Fig. 2 a vertical section, of such weighing apparatus.

In such drawings, A represents a box for containing the principal operative parts. Within the box is a pendulum, B, supported by a cross-shaft, $a$, and having an arm, $b$, projecting from the shaft, in manner as represented in Fig. 2. This arm has knife-edges $c\ c$ extending from it in opposite directions, as shown in Fig. 3, and into and against bearings $d\ d$, formed in a vertical scale-supporter, C, on whose upper end a scale or platform, D, is fixed. This supporter extends through a slot, $e$, in the cover of the box, and at its foot is jointed to a radial arm, $f$, jointed to one end of the box, and arranged as represented in Fig. 2.

From the weight $g$ of the pendulum a curved toothed arc, $h$, is projected toward and so as to engage with a pinion, $i$, carried by a shaft, $k$, which extends across the box and through its side or each of its sides, and carries in each or either end an index-pointer, $m$, to operate with a dial-plate, $n$, fixed to the side of the box, and being marked with divisions and numbers, to exhibit the weight of a body when placed on the platform.

There may be other ways of applying the scale pan or platform to the arm of the pendulum, and therefore we do not confine our invention to the precise mode or means of applying the platform, as represented.

A body placed on the platform will cause the pendulum to move away from its normal position, and thereby move the curved rack, which will then move the pinion so as to revolve the shaft thereof and turn the index-pointer to that division on the dial which will represent the weight of the body on the platform.

The said platform we construct with a circular depression or recess, $o$, at its center, the same being to hold any small weight which may be required to effect the balancing of the scale—that is, so as to bring its index-pointer to the point of starting, or zero of the dial.

We are aware of the subject of the Patent No. 53,020, and therefore make no claim thereto.

We have made an improved arrangement of the pendulum B and its arm $b$, and the scale-pan supporting-rod C and its guide-arm $f$, whereby we have greatly simplified the mechanism or parts with reference to the weighing mechanism shown in such patent, as we dispense with an auxiliary lever and sundry other parts, and we effect the vertical movements of the scale-pan through the direct action of the arm $a$ and the arm $f$. Therefore

We claim—

Our improved arrangement of the scale-pan rod C, the arms $b$ and $f$, and the pendulum B, combined with the curved rack $h$, employed with the pinion $i$, and its dial-conductor $m$, the whole being substantially as described.

GEORGE BABSON.
JOHN L. BABSON.

Witnesses:
R. H. EDDY,
E. P. HALE, Jr.